US010628836B2

(12) United States Patent
Goel et al.

(10) Patent No.: US 10,628,836 B2
(45) Date of Patent: Apr. 21, 2020

(54) EFFICIENT COMPUTATION OF VARIABLE PREDICTIVENESS

(71) Applicant: ADOBE INC., San Jose, CA (US)

(72) Inventors: Nitin Goel, Ghaziabad (IN); Manoj Awasthi, Ghaziabad (IN); Kapil Malik, Haryana (IN)

(73) Assignee: ADOBE INC., San Jose, CA (US)

( * ) Notice: Subject to any disclaimer, the term of this patent is extended or adjusted under 35 U.S.C. 154(b) by 842 days.

(21) Appl. No.: 14/610,186

(22) Filed: Jan. 30, 2015

(65) Prior Publication Data

US 2016/0224895 A1     Aug. 4, 2016

(51) Int. Cl.
*G06Q 30/02* (2012.01)
*G06N 5/04* (2006.01)
*G06N 7/00* (2006.01)

(52) U.S. Cl.
CPC .............. *G06Q 30/02* (2013.01); *G06N 5/04* (2013.01); *G06N 7/005* (2013.01)

(58) Field of Classification Search
CPC .......... G06N 5/04; G06N 5/048; G06N 7/005; G06N 7/04; G06Q 30/02
See application file for complete search history.

(56) References Cited

U.S. PATENT DOCUMENTS

| | | | | |
|---|---|---|---|---|
| 6,651,048 B1* | 11/2003 | Agrawal | ........... | G06F 17/30539 |
| 6,651,049 B1* | 11/2003 | Agrawal | ........... | G06F 17/30539 |
| | | | | 706/1 |
| 8,775,338 B2* | 7/2014 | Lee | .......... | G06F 17/18 |
| | | | | 706/13 |
| 2002/0161609 A1* | 10/2002 | Zizzamia | ........... | G06Q 10/0635 |
| | | | | 705/4 |
| 2005/0020310 A1* | 1/2005 | Nakaya | ...... | H01Q 3/26 |
| | | | | 455/562.1 |
| 2009/0157589 A1* | 6/2009 | Merugu | .......... | G06N 5/04 |
| | | | | 706/56 |
| 2009/0254971 A1* | 10/2009 | Herz | ........ | G06Q 10/10 |
| | | | | 726/1 |
| 2010/0057509 A1* | 3/2010 | Kumar | ............ | G06Q 10/10 |
| | | | | 703/2 |
| 2010/0169203 A1* | 7/2010 | Semenov | .............. | G06Q 10/04 |
| | | | | 705/35 |

(Continued)

*Primary Examiner* — Benjamin P Geib
(74) *Attorney, Agent, or Firm* — Shook, Hardy & Bacon, L.L.P.

(57) ABSTRACT

Embodiments of the present invention relate to efficiently computing variable predictiveness such that an indication of variable predictiveness can be provided in real time. In this regard, aspects of the present invention enable a user (e.g., digital marketer) to input a query and, in response, receive an indication of variable predictiveness. To efficiently compute variable predictiveness in response to a submitted user query, mutual information is computed offline and, thereafter, used to generate, in real time, conditional mutual information of variables for a specified date range. The concept of conditional mutual information can be utilized to represent variable predictiveness or otherwise indication variable predictiveness, such as to identify a set of variables that accurately predict a metric. Using such an approach effectively reduces a number of data access attempts and calculations performed in real time thereby reducing utilization of a processor(s).

20 Claims, 7 Drawing Sheets

(56) References Cited

U.S. PATENT DOCUMENTS

| | | | |
|---|---|---|---|
| 2010/0306249 A1* | 12/2010 | Hill | G06F 17/30867 707/769 |
| 2011/0040613 A1* | 2/2011 | Simmons | G06Q 30/02 705/14.42 |
| 2011/0040636 A1* | 2/2011 | Simmons | G06Q 30/02 705/14.71 |
| 2011/0161263 A1* | 6/2011 | Lee | G06F 17/18 706/13 |
| 2011/0208183 A1* | 8/2011 | Stockert | A61B 18/1206 606/35 |
| 2012/0084291 A1* | 4/2012 | Chung | G06F 17/301 707/741 |
| 2012/0310737 A1* | 12/2012 | Song | G06Q 30/0261 705/14.57 |
| 2012/0323674 A1* | 12/2012 | Simmons | G06Q 30/02 705/14.41 |
| 2013/0238413 A1* | 9/2013 | Carlson | G06Q 30/0224 705/14.25 |
| 2013/0325587 A1* | 12/2013 | Kothari | G06Q 30/0243 705/14.42 |
| 2014/0046777 A1* | 2/2014 | Markey | G06Q 30/0269 705/14.66 |
| 2015/0278703 A1* | 10/2015 | Liu | G06N 99/005 706/12 |
| 2016/0143594 A1* | 5/2016 | Moorman | A61B 5/02405 705/2 |
| 2016/0224895 A1* | 8/2016 | Goel | G06Q 30/02 |

* cited by examiner

| VARIABLES | REPRESENTATIVE VALUES |
|---|---|
| BROWSER | CHROME, FIREFOX, SAFARI, INTERNET EXPLORER |
| OPERATING SYSTEM | WINDOWS 8, WINDOWS 7, MACINTOSH OSX |
| REFERRER | WWW.GOOGLE.COM, WWW.BING.COM |
| CITY | NEW YORK, LOS ANGELES, HOUSTON |
| COUNTRY | UNITED STATES, CANADA, INDIA, CHINA |
| HOURS SINCE LAST VISIT | 0.0, 1.0, 2.0, 5.0, 10.0, 20.0 |
| REVENUE | 10.00, 20.00, 100.00, 213.21, 42.99 |
| PURCHASED | TRUE, FALSE |
| NEW VISITOR | TRUE, FALSE |

FIG. 8

EFFICIENT COMPUTATION OF VARIABLE PREDICTIVENESS

BACKGROUND

Web analytics is frequently performed to discover or predict useable information and to support decision making. Many businesses rely on web analytics to improve performance and/or quality of a website. For example, modern web analytic services can measure and report data associated with hundreds of variables for an online service(s). The captured data can be used to forecast or predict a metric of interest(s), such as revenue, conversions, or other measurement of website/business performance.

To improve website or business performance in relation to a particular metric, a marketer may be interested in variable predictiveness, which indicates an extent to which a variable can predict the metric. Variable predictiveness can be used to customize a website to improve or optimize a metric outcome(s). For example, when a particular variable is indicated as accurately predicting a designated metric, the digital marketer can place an emphasis in connection with that variable to customize a website for a particular user segment (e.g., males) or for a particular visitor.

In computing variable predictiveness, conventional systems generally utilize mutual information as an indicator of variable predictiveness with respect to a metric. However, calculating mutual information for an extensive number of variables may be computationally and time intensive making it difficult for a processor to generate such data in real time. For instance, to dynamically compute mutual information for thousands of variables in real time using prior approaches, a significant number of data access attempts and logarithm computations would need to be performed. Such data access attempts and computations are difficult to scale and perform in real-time, particularly when multiple queries are concurrently received. Because of the intensive computations required to calculate mutual information for each variable and metric combination in real time, prior approaches of generating variable predictiveness are generally limited to small amounts of data, fixed data ranges, and/or offline computations of predetermined queries (e.g., date ranges).

SUMMARY

Embodiments of the present invention relate to efficiently computing variable predictiveness such that an indication of variable predictiveness can be provided in real time. In this regard, aspects of the present invention enable a user (e.g., digital marketer) to input a query and, in response, receive an indication of variable predictiveness, such as an indication of variables that provide an accurate prediction of a metric. To efficiently compute variable predictiveness in response to a submitted user query, mutual information is computed offline and, thereafter, used to generate conditional mutual information of variables for a specified date range in real time. In this regard, mutual information is computed offline in parts (i.e., partial mutual information) for logical sets of data, such as data collected for a day. Thereafter, mutual information of partial data, or partial mutual information, can be used to generate conditional mutual information of variables for specified logical sets of data. As described herein, the concept of conditional mutual information can be utilized to indicate variable predictiveness in real time. Using such an approach effectively reduces a number of data access attempts and calculations performed in real time thereby reducing utilization of a processor(s).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 8 provides exemplary variables and representative values, in accordance with embodiments of the present invention.

DETAILED DESCRIPTION

Figure 1:
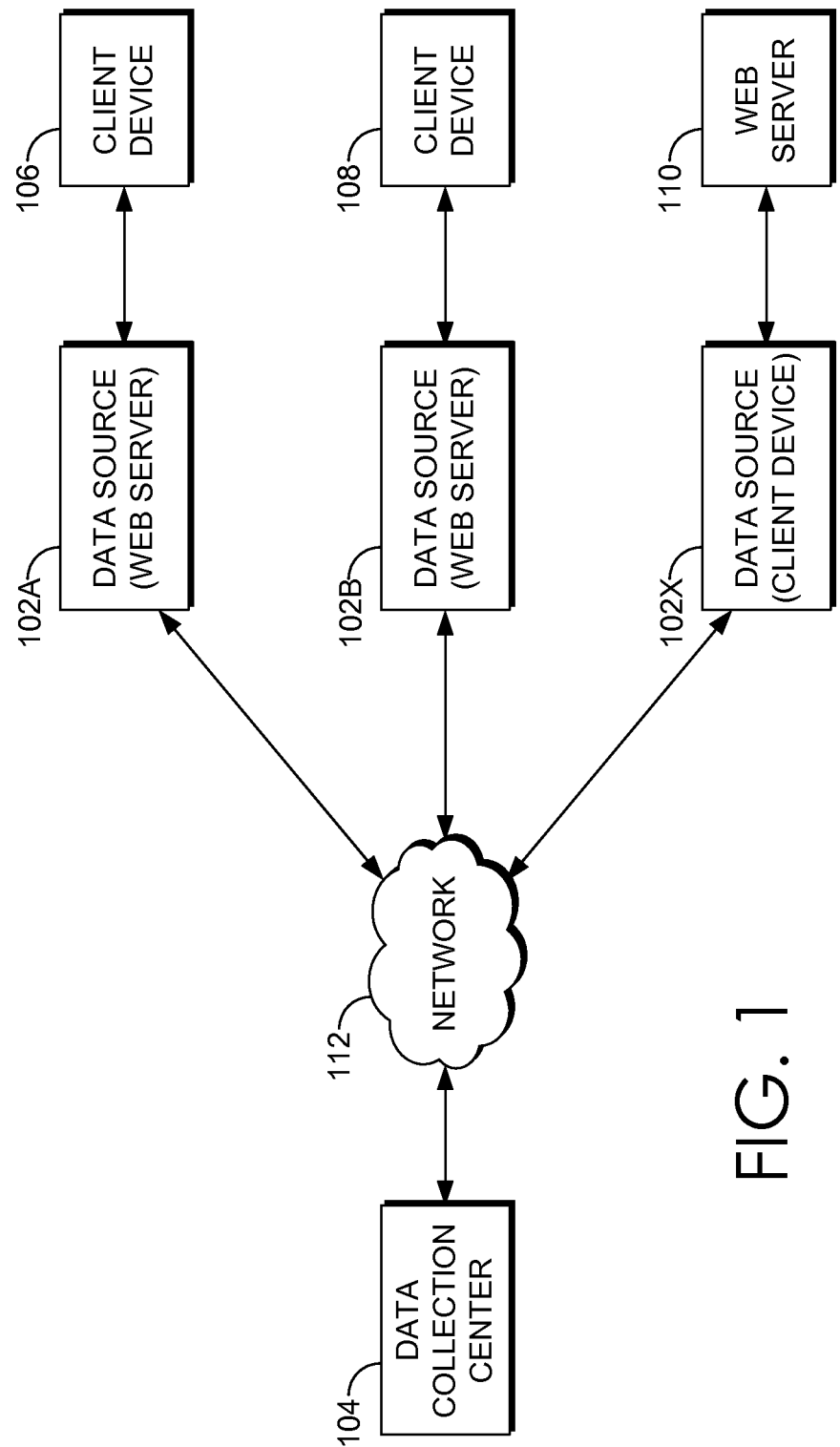
FIG. 1 is a block diagram of an exemplary web analytics environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Web analytics is frequently utilized to analyze and report web data such that a website provider can understand and optimize web usage. In this regard, data associated with various variables (e.g., types of information associated with website navigation or a visitor(s) thereof) are collected and utilized to predict a metric generally related to performance of a website (e.g., offers shown, offers viewed, offers redeemed, conversions, revenue, website visits, page visits, visit time, revenue per visit, average order value, etc.). Oftentimes, a digital marketer associated with a website may wish to know how predictive a variable(s) is with respect to a metric and/or which variables being measured most accurately predict a metric outcome. As such, variable predictiveness can be computed to indicate an extent to which a variable can predict a metric. An indication of variable predictiveness can be provided to a user that requested such information.

Recognizing variable predictiveness and/or a set of variables that most accurately predicts a metric is invaluable to those utilizing the data to make decisions, such as a digital marketer. For example, assume that numerous variables are collected in association with navigation of a website including type of browser, type of device, country of origin, user gender, user age, etc. Further assume that age is identified as a variable that accurately predicts a revenue metric (e.g., how much revenue a specific website is generating). As an end-goal of a digital marketer may be to increase or optimize revenue, the age variable can be used to modify or customize a website in an effort to increase revenue. Exemplary examples of website improvements include modifying the website to attract more users within a particular age segment (e.g., 20-30 years of age) or providing a particular offer when a user within a particular age segment visits the website. To assist in visitor customization and/or website optimization, some web analysis tools, such as the ADOBE TARGET tool, have been developed that provide mechanisms to manage website analysis and provide data in association with customization and/or optimization associated therewith. With such tools, an indication of variable predictiveness can be computed and reported resulting in more useful information being provided to users of the tools and website visitors. For example, an indication of variable predictiveness of a variable(s) can be utilized by a digital marketer to modify a website, can trigger an automated personalization of a website or advertisement presented therein, can provide variable selection for automated personalization, can assist marketer to identify user segments to target for a particular metric performance, etc.

Conventional systems used to compute variable predictiveness generally utilize mutual information as an indicator of predictiveness of a variable with respect to a metric. That is, mutual information, which generally refers to a measure of mutual dependence (information shared), has traditionally been used as an indication of whether a variable can predict a metric and if the metric can predict the variable. With an extensive quantity of data that may be captured and analyzed, however, using prior approaches to calculate variable predictiveness (e.g., to identify variables that most accurately predict a metric) can be difficult. In particular, calculating mutual information for an extensive number of variables may be computationally and time intensive making it difficult for a processor to generate such data in real time. By way of example only, assume data is collected for 1000 variables over a 90 day time period. Further assume that a website marketer desires to know which variables were most predictive during a specific one week time period. To dynamically compute mutual information for each of the 1000 variables in real time for a logical set of data (e.g., a date range) using prior approaches, a significant number of data access attempts and logarithm computations would need to be performed. For instance, data access attempts may be required for the product of number of days in queried date range (e.g., 7), number of variables (e.g., 1000), and average number of variable values. Further, for each variable, there may be logarithm computations equaling the number of variable values times the number of metric values. Such data access attempts and computations are difficult to scale and perform in real-time, particularly when multiple queries are concurrently received. Because of the intensive computations required to calculate mutual information for each variable and metric combination in real time, prior approaches of generating variable predictiveness are generally limited to small amounts of data, fixed data ranges, and/or offline computations of predetermined queries (e.g., date ranges).

As such, embodiments of the present invention are directed to efficiently computing variable predictiveness such that an indication of variable predictiveness can be provided in real time, that is, as a query is input or received such that an indication of variable predictiveness can be determined and provided nearly immediately. In this regard, aspects of the present invention enable a user (e.g., digital marketer) to input a query and, in response, receive an indication of variable predictiveness (e.g., variables that provide an accurate prediction of a metric). To efficiently compute variable predictiveness in response to a submitted user query, mutual information, which is an indicator of predictiveness, is computed offline and, thereafter, used to generate conditional mutual information of variables for a specified date range in real time. In particular, for efficiency, mutual information is computed offline in parts (i.e., partial mutual information) for logical sets of data, such as data per day. Thereafter, mutual information of partial data, or partial mutual information, can be used to generate, in real time, conditional mutual information of variables for specified logical sets of data by conditioning it on the same logical entity (e.g., per day). The conditional mutual information can be used to indicate variable predictiveness. Mutual information generally refers to a measure of mutual dependence (information shared) between a variable and a metric. Partial mutual information refers to mutual information of partial data, such as data associated with a specified logical set or time period (e.g., day). Conditional mutual information generally refers to the expected value of the mutual information of two variables (variable/metric) conditioned on some additional information (z). As described in embodiments herein, conditional mutual information is calculated using precomputed partial mutual information.

By way of example only, assume data is collected for 1000 variables over a 90 day time period. For each logical data set, such as per day, partial mutual information is computed using existing techniques for data collected over that 90 day time period and stored. Upon receipt of a query requesting variable predictiveness corresponding with one week within the 90 day time period, predetermined partial mutual information for each logical data set (day) within the specified one week is retrieved and used to generate conditional mutual information for variables. To generate conditional mutual information for a variable, the probability of a variable for a particular logical data set (day) can be multiplied by the corresponding partial mutual information. The products for the various logical data sets within the one week time frame can then be added to arrive at the conditional mutual information for the variable.

Using such an approach effectively reduces a number of data access attempts and calculations performed in real time thereby reducing utilization of a processor(s). Because partial mutual information of variables are maintained per logical data set (e.g., per day), fewer data access attempts and calculations are performed in real time in response to a predictiveness query. These reductions in time, memory, and CPU utilization result in better performance, increased response time, and operational in memory caching.

Efficient computation of variable predictiveness is invaluable in many environments. For example, in an exemplary environment of web analytics, variable predictiveness is desirable for any number of analyses performed on data associated with website traffic. An exemplary web analytics environment is illustrated in FIG. 1. A data collection center 104 associated with an analysis tool(s) (not shown) is used to collect a large amount of web data available via the World Wide Web, which may include any number of web services or sites. The amount of data available is extremely large, and it may be impractical or burdensome for the website provider to collect and/or analyze such data. As such, a data collection center associated with an analysis tool(s) can collect web site visitors' online web data such as page views and visits that are relevant to a web site(s) and/or a visitor thereof.

Such a large amount of web data results, in part, from the numerous data sources providing web data. With continued reference to FIG. 1, in one embodiment, each of the data sources 102A, 102B, and 102X provide a data collection center 104 with data describing web traffic. Each of data sources 102A, 102B, and 102X is a data source, such as a web server or a client device, capable of providing data associated with website usage, for example, via a network 112. For instance, data source 102A might be a web server associated with a website, data source 102B might be a web server associated with the website, and data source 102X might be a client device being used to navigate the website via a browser.

As illustrated in FIG. 1, data source 102A and data source 102B can obtain web data based on interactions with the respective client devices 106 and 108. In this regard, the browsers of the client devices can request web pages from the corresponding web servers and, in response, the web servers return the appropriate HTML page to the requesting client devices. Web data detected from navigations of the corresponding web pages at client devices 106 and 108 can be obtained at the web servers 102A and 102B and provided to the data collection center 104 via the network 112. By comparison, data source 102X can be a client device having a browser that requests a web page from a web server 110. The web server 110 can return to the client device 102X the appropriate HTML page with code (e.g., JavaScript code) that triggers communication of the web data to the data collection center 104 via the network 112.

Although FIG. 1 illustrates data sources as including both web servers and client devices, in some embodiments, such data sources might be solely web servers or solely client devices. Further, as can be appreciated, the web data provided to the data collection center 104 from the data sources can be associated with any number of web sites. For instance, in some cases, each of the data sources might provide data associated with a single web site (e.g., various clients navigating a particular web site). In other cases, the data sources might provide web data associated with multiple web sites (e.g., web servers associated with various web sites).

While FIG. 1 is generally described herein in reference to a web analytics environment, data collection may occur in any number of environments including any other web or non-web related environment. Irrespective of the environment, the data collection center 104 can collect data from any number of data sources and in any manner.

As will be discussed in further detail below, an analysis tool(s) can be used to generate, utilize, and/or report variable predictiveness, or an indication thereof. The analysis tool(s) can perform such functionality in association with any amount of numerical data. Further, the variable predictiveness computation and/or reporting functionality described herein can be applied to data associated with any type of subject matter, such as, for example, shopping data, text document data, advertisement targeting data, or the like.

Figure 2A:
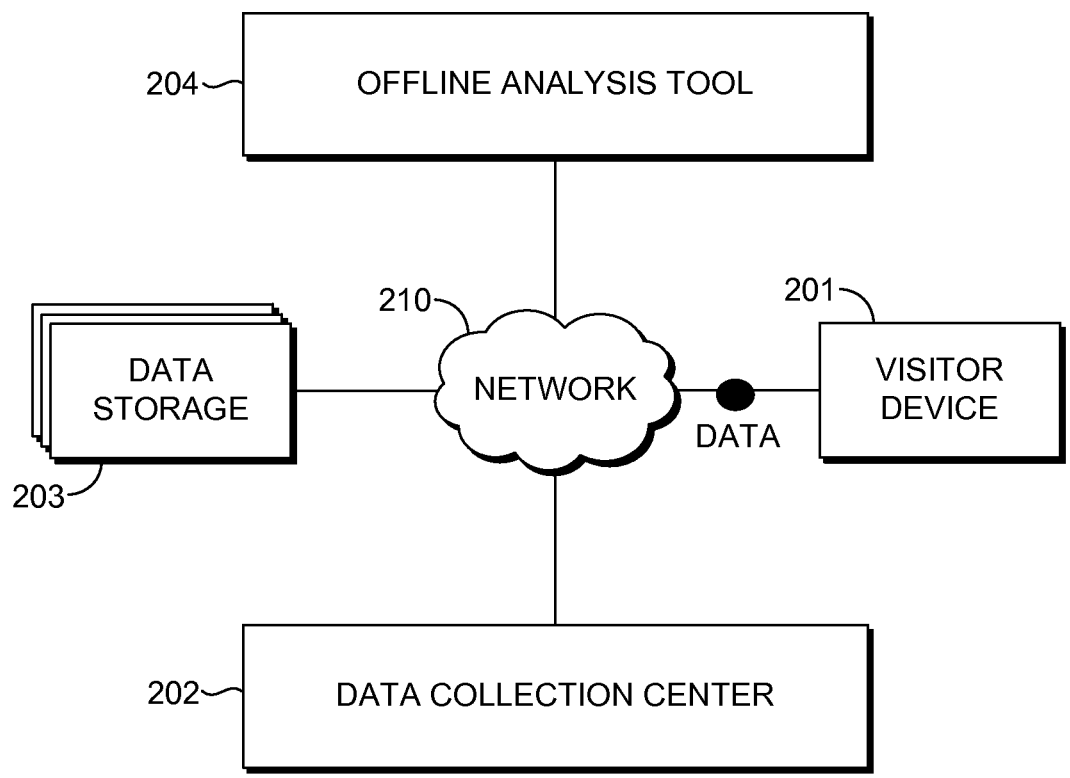
FIGS. 2A and 2B are block diagrams of an exemplary computing environment suitable for use in implementing embodiments of the present invention.
Figure 2B:
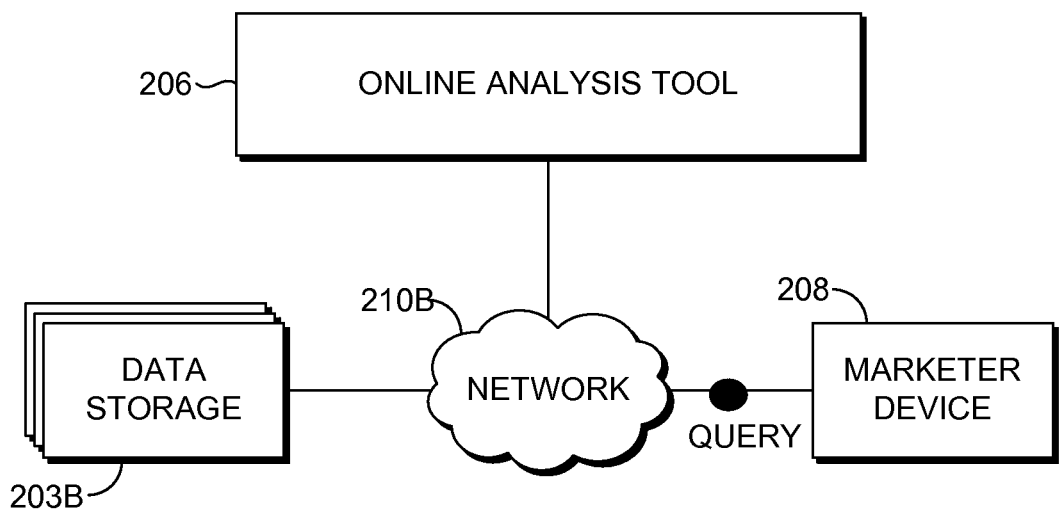

Having briefly described an overview of embodiments of the present invention, block diagrams are provided in FIGS. 2A and 2B illustrating an exemplary system in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 2A illustrates aspects of the offline analysis described herein, and FIG. 2B illustrates aspects of the online analysis described herein. Although the offline and online analyses are illustrated separately, as can be appreciated, the analyses tools can operate in a single system as contemplated by the inventors. The aspects are simply shown separately to simplify the discussion herein. Among other components not shown, the system illustrated in FIG. 2A includes a visitor device 201, a data collection center 202, data storage 203, and an offline analysis tool 204. It should be understood that the system shown in FIG. 2A is an example of one suitable computing system architecture to perform offline analysis. Each of the components shown in FIG. 2A may be implemented via any type of computing device, such as computing device 700 described with reference to FIG. 7, for example. The components may communicate with each other via a network 210, which may include, without limitation, one or more local area networks (LANs) and/or wide area networks (WANs). Such networking environments are commonplace in offices, enterprise-wide computer networks, intranets, and the Internet.

It should be understood that any number of visitor device 201, data collection center 202, data storage 203, and offline analysis tool 204 may be employed within the system of FIG. 2A within the scope of the present invention. Each may comprise a single device, or portion thereof, or multiple devices cooperating in a distributed environment. For instance, the offline analysis tool 204 may be provided via multiple devices arranged in a distributed environment that collectively provide the functionality described herein. Alternatively, the offline analysis tool 204 of FIG. 2A and the online analysis tool 206 of FIG. 2B may be combined as a single analysis tool to provide the computation functionality described herein. As another example, multiple data collection centers 202 may exist, for instance, to be located in remote locations, to increase storage capacity, or to correspond with distinct information (e.g., a separate data collection center for separate websites). Additionally, other components not shown may also be included within the network environment.

The data collection center 202 may collect data from any number of data sources and any type of data sources (e.g., such as data collection center 104 illustrated in FIG. 1). In some cases, the data sources generally include any online presence at which website usage occurs or can be detected. In such cases, the data collection center 202 may access data from a web server(s) providing a website(s) and/or from a visitor device(s), such as visitor device 201, at which a website(s) is being browsed or navigated. As can be appreciated, a data collection center may collect data by polling or by listening for interrupts. The data collection center 202 can collect any amount of data including raw or processed data. Any and all such variations of data sources and data associated with the data collection center 202 are contemplated to be within the scope of embodiments of the present invention.

Generally, data collected within the data collection center 104 can represent observed data associated with various variables. Data associated with any number or type of variables can be collected. For example, data associated with hundreds or thousands of variables might be collected. A variable generally refers to a feature, covariate, predictor, attribute, factor, regressor, or any other type of data, for example, represented by a column or row in a data matrix. In a web analytics environment, a variable is generally an entity that is measured in association with a visitor viewing and/or navigating a website. Such variables may include information recorded from the environment in which the visitor browsed (e.g., a type of browser, a type of operating system, whether it was a mobile device, geolocation data, etc.), information about the visitor (e.g., visitor demographics), information associating website navigation (e.g., links selected, navigation time, etc.). As such, the data collection center 202 can collect click stream data associated with visitor device 201. Exemplary variables and representative values are provided in FIG. 8.

The particular variable(s) for which data is collected can be designated in any manner. In some cases, any and all variables as designated or selected by a provider of data analysis might be captured. In other cases, variables designated by a user might be captured. A user refers to an individual or entity (e.g., an online service provider) to obtain data or reports (e.g., variable predictiveness), for example, provided from a data analysis provider. In some cases, a user may be a digital marketer of a web site provider that wishes to obtain a report of variable predictiveness. For example, a marketer of the marketer device 208 of FIG. 2B might designate or select (e.g., via a web service or application) a set of variables for which the user is interested in collecting and/or viewing data.

The collected data can be represented in the form of one or more matrices or data sets. A matrix or data set can be defined by a set of rows and a set of columns. The rows can represent a time series, observations, events, instances, or any other type of data. The columns can represent variables, for instance, features, covariates, predictors, attributes, factors, regressors, or any other type of data. By way of example only, in one embodiment, the rows of a matrix represent various web observations, and the columns represent various observed variables, for example, pertaining to website visitors, website visits, etc.

As can be appreciated, the data collected within the data collection center 202 can be updated or modified at any time in accordance with various implementations. For example, in some embodiments, data can be added to the data set in real-time or as realized by a computing device, such as a web server. Although web data is generally described herein, any type of data is within the scope of embodiments of the present invention. Web data is only one example of data that can be collected and utilized in accordance with embodiments described herein.

The collected data can be stored in a storage area, such as data storage 203, for reference by the offline analysis tool 204 and/or online analysis tool 206. The data storage 203 can be distributed, such as, for example, Apache® HBase.

Irrespective of what the values or data entries represent, the offline analysis tool 204 can utilize the data to perform offline computations. Performing offline computations enables a more efficient computation of variable predictiveness in real time (e.g., in response to a user query). As such, the offline analysis tool 204 generally uses collected data to perform mutual information computations that enable more efficient computation of variable predictiveness in response to a user query. In this regard, mutual information is computed offline in parts (i.e., partial mutual information) for logical sets of data, such as data collected for a day. Thereafter, mutual information of partial data, or partial mutual information, can be used to generate conditional mutual information of variables for specified logical sets of data. As such, such partial mutual information can be subsequently used in an online analysis to dynamically compute variable predictiveness for variables with respect to a metric.

A metric generally refers to any type of measurement used to indicate or gauge some quantifiable component of data for which a forecast is desired. Oftentimes, a metric is related to performance, but is not intended to be limited herein. By way of example, and without limitation, a metric may be a type of measurement related to marketing or performance, such as an offer shown, an offer viewed, an offer redeemed, conversions, revenue, website visits, page visits, visit time, revenue per visit, average order value, visits from a certain geography, conversions in a particular segment of visitors, etc.

Mutual information generally refers to a measure of mutual dependence (information shared) between a variable and a metric. Specifically, mutual information determines an extent of similarity the joint distribution $p(X,Y)$ is to the products of factored marginal distribution $p(X)p(Y)$. For example, if X and Y are independent, mutual information is zero as knowing X (e.g., age of visitor) does not give any information about Y (e.g., website revenue). On the other hand, if X is a deterministic function of Y and Y is a deterministic function of X, then information conveyed by X is shared with Y resulting in a greater mutual information value.

To generate mutual information in association with variables, initially, the offline analysis tool 204 can select or identify a particular set of data to analyze from the data storage 203. In some cases, all of the data within the data storage 203 might be analyzed. In other cases, a portion of the captured data might be analyzed. For example, a portion of the variables might be analyzed. Alternatively or additionally, a portion of the records or observations might be analyzed. For instance, an extent of the most recently captured records might be analyzed (e.g., within the month) for purposes of generating mutual information or an extent of variables designated by a website provider (e.g., digital marketer) might be analyzed.

The offline analysis tool 204 can use the referenced data to perform mutual information calculations. In one embodiment, mutual information is calculated for variables in association with a time period or time interval, such as a per-day-basis. For instance, the offline analysis tool 204 might generate per day mutual information for each variable (e.g., age, gender, browser type, device type, etc.).

In some cases, to facilitate computation of mutual information for each variable in association with a metric, the offline analysis tool 204 can generate key/metric value pairs. A key refers to uniqueness of a variable and its context. As a variable can be associated with various variable attributes, each variable attribute can be associated with a different key. A variable attribute refers to a characteristic, description, or segment of a variable. For instance, in connection with a variable of gender, one variable attribute might be male while another variable attribute might be female. As such, a key may be described as a variable, a variable attribute, and contextual data associated therewith (e.g., date). By way of example only, assume that the variable "age" has five variable attributes, namely, 0-10 years, 10-20 years, 20-30 years, 30-50 years, and 50-100 years. In such a case, generated keys might be {age, 0-10, 22 May}, {age, 10-20, 22 May}, {age, 20-30, 22 May}, {age, 30-50, 22 May}, {age, 50-100, 22 May}, {age, 0-10, 23 May}, {age, 10-20, 23 May}, {age, 20-30, 23 May}, {age, 30-50, 23 May}, and {age, 50-100, 23 May}. In this example, "age" represents the variable, the age segment (e.g., 10-20) represents the variable attribute, and the date represents the context. Contextual data can be of any number or substance of data.

A metric value refers to a value of a metric associated with a corresponding key. For example, a metric value for a key may be a number of conversions associated with the key, a number of websites visits associated with the key, a revenue associated with the key, etc. Generally, the metric value is a value associated with a particular time period or logical data set, such as, for example, a day. In this regard, the metric value might be an aggregate of occurrences with respect to a metric on a particular day.

Figure 3:
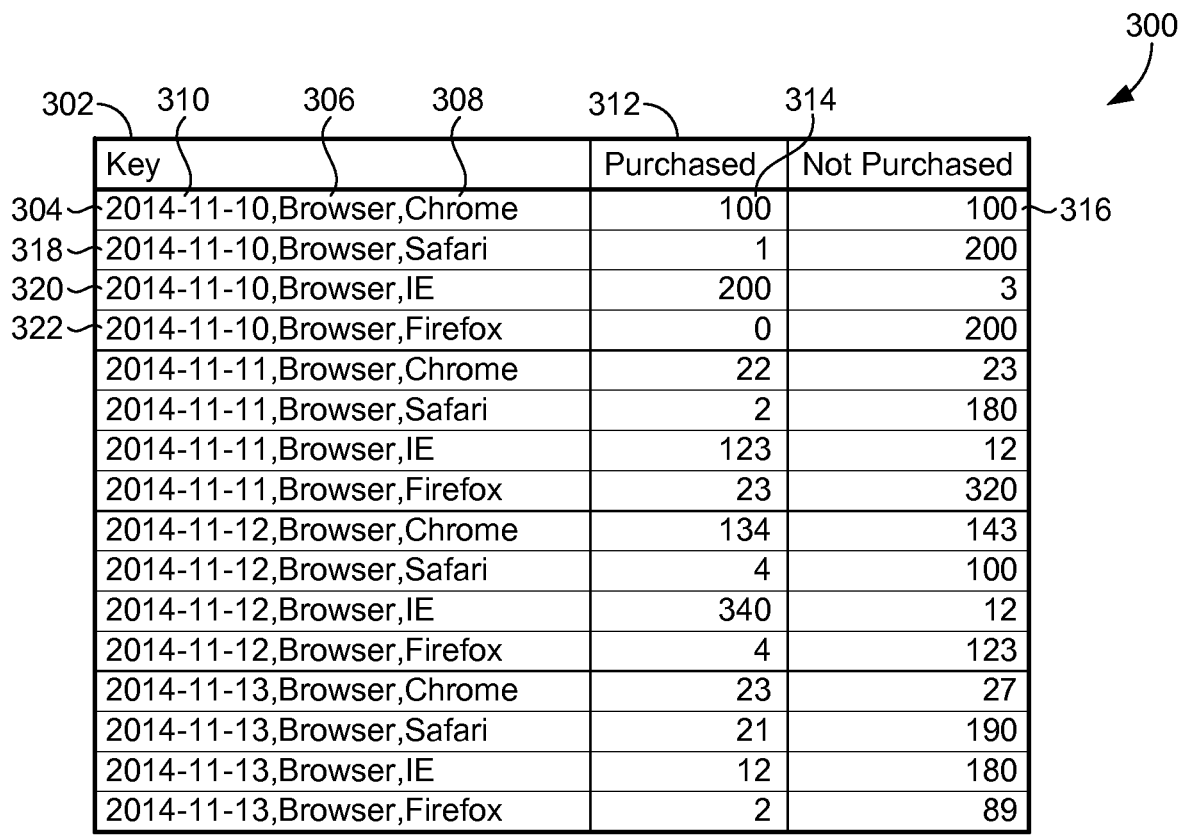
FIG. 3 depicts an exemplary data set illustrating key/metric value pairs, according to embodiments of the present invention.

With reference to FIG. 3, FIG. 3 illustrates an example data set 300 of various key/metric value pairs. Data set 300 illustrates a set of keys 302. For example, key 304 includes the variable "browser" 306, the variable attribute 308 (e.g., Chrome), and context 310 (e.g., date of 2014 Nov. 10). The data set 300 also includes the corresponding set of metric values 312 representing conversion data. For example, metric value 314 of 100 represents 100 conversions in relation to key 304, and metric value 316 of 100 represents 100 instances in which conversions did not result. As can be appreciated, each metric may have multiple metric values, such as conversion or no conversion, as illustrated in FIG. 3.

Using the metric values and various keys associated with a particular variable for a time period or logical set of data, partial mutual information can be computed and stored for that variable in association with a metric. In other words, partial mutual information can be generated for each variable for a time period (e.g., day). As such, metric values associated with each variable attribute corresponding with a particular variable occurring on a particular day can be used to generate mutual information for that variable with respect to that particular day. For instance, with reference to FIG. 3, metric values associated with keys 304, 318, 320, and 322 can be used to generate mutual information associated with the "browser" variable on Nov. 10, 2014 (e.g., partial mutual information 408 of FIG. 4). Mutual information can be generated using the Equation 1 as indicated below:

$$I(X;Y) = \sum_{y \in Y}\sum_{y \in X} p(x,y) \log\left(\frac{p(x,y)}{p(x)p(y)}\right) \quad \text{Equation 1}$$

where p(x,y) is the joint probability distribution function of X and Y, and p(x) and p(y) are marginal probability distribution functions of X and Y, respectively. In relation to web analytics, X generally represents variable attribute, and Y represents the metric outcomes. For example, and with reference to FIG. 3, assume partial mutual information is being calculated for Nov. 10, 2014. Further assume that x can have values of Safari, Chrome, IE, Firefox, and y can have values of Purchased and Not purchased. In such a case, the partial mutual information can be calculated by summing calculations of [P(x,y) log(P(x,y)/(P(x)*P(y)))] for all combinations of x and y (here we have 4*2 combinations). For instance, for the value of x being Safari and the value of y being Purchased, the below calculations can be performed and used to compute [P(x,y) log(P(x,y)/(P(x)*P(y)))] for ha particular combination of x and y. Similiar calculations can be performed for each additional combination of x and y and, thereafter, summed to generate the partial mutual information for Nov. 10, 2014 with respect to the "browser" variable.

$P(\text{Browser=Safari}, M=\text{Purchased})=1/(100+100+1+200+200+3+0+200)$ $P(\text{Browser=Safari } M=\text{Not purchased})=200/(100+100+1+200+200+3+0+200)$ $P(\text{Browser=Safari})=(200+1)/(100+100+1+200+200+3+0+200)$ $P(M=\text{Purchased})=(100+1+200+0)/(100+100+1+200+200+3+0+200)$ In addition to calculating mutual information for each variable, an aggregate can also be calculated and stored in association with each variable per time period or logical set of data (e.g., day). For instance, such data can be stored in data storage 203 or other data storage. An aggregate can refer to instances or observations associated with a particular logical data set or time period, such as a day. For example, an aggregate might be a total number of website visits for a day. Aggregates can be used to predict the probability (or weight) of a particular time period (day), which can be used to compute variable predictiveness. As can be appreciated, other methods can be used to predict the probability of particular day for a given variable. Probability for a day (or logical part) can be based on any factor. Number of visits is one such case, but probability can be based on other factors, such as number of "add to cart" events in a day or other feature metric for a day. As can be appreciated, the information used to calculate the probabilities for a logical set or time period may cause differences in the resulting conditional mutual information. For example, when "number of add to cart events" is used as an indicator of particular day probabilities, the conditional mutual information means "predictiveness between variable and metric conditioned that visit happens with add to cart."

Figure 4:
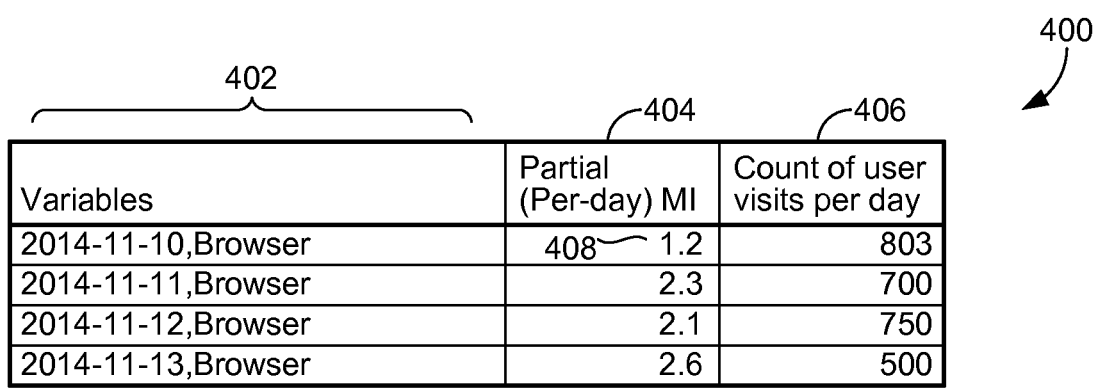
FIG. 4 depicts an exemplary data set illustrating mutual information and metric aggregate data in association with a variable, in accordance with embodiments of the present invention.

By way of example only, and with reference to FIG. 4, assume that mutual information is computed for a "browser" variable in association with a "UserPurchasedItemX" metric. In FIG. 4, a set of "browser" variables 402 are provided for a series of days (e.g., Nov. 10, 2014, Nov. 11, 2014, Nov. 12, 2014, and Nov. 13, 2014) along with a corresponding partial (per-day) mutual information 404 and metric aggregates 406 (e.g., count of user visits per day).

Mutual information and corresponding aggregated data can be captured and stored in a data store. For instance, the data set 400 of FIG. 4 can be generated and stored in a data store for real-time access in response to a user query. In one implementation, mutual information and aggregated data associated therewith can be stored in a database, such as Apache® HBase. The data can be sorted within a data store based on any number of aspects, such as date, variable, etc.

As previously described, calculating mutual information as a measure of per day (or per logical data set) predictiveness for each variable in an offline environment reduces real-time computation for variable predictiveness. With prior approaches, an extensive amount of time, memory, and CPU utilization are required. By way of example only, assume data is collected in association with 100 variables, each having 10 values, resulting in 1000 rows of data per day. Further assume a live API call for a random 15 day range query. In such a case, 15,000 (or more) rows may be loaded from HBase and 15,000 aggregations and 15000*2 log computations may be performed. An extensive amount of memory is required to maintain 15,000 (variable value) rows. Further, the CPU utilization can include 15,000*2 aggregations, 15,000*3*2 probability computations, and 15,000*2 log computations. In comparison with the embodiments described herein, in which mutual information for all variables are maintained per day, the time, memory, and CPU impacts are significantly less. With 100 variables, each having 10 values, only 100 rows of data results per day are stored. Further, with a live API call for random 15 day range query, approximately 1,500 rows are loaded from HBase and approximately 1,500 aggregations and 1,500 simple multiplications are performed. Memory maintains 1,500 rows, and CPU utilization only includes about 1,500 aggregations and 1,500 simple multiplications. These reductions in time, memory, and CPU utilization result in better performance, increased response time, and operational in memory caching.

As can be appreciated, partial mutual information can be calculated for multiple metrics. For example, mutual information can be calculated for each variable in association with a conversion metric and for each variable in association with a revenue metric. In this regard, mutual information and corresponding aggregated data can be captured for multiple metrics such that a query can request variable predictiveness associated with any number of metrics.

Turning to FIG. 2B, FIG. 2B illustrates aspects of the online analysis described herein. Although the offline and online analyses are illustrated separately, as can be appreciated, the analyses tools can operate in a single system as contemplated by the inventors. The aspects are simply shown separately to simplify the discussion herein. Among other components not shown, the system illustrated in FIG. 2B includes a marketer device 208, data storage 203B, and an online analysis tool 206. It should be understood that the system shown in FIG. 2B is an example of one suitable computing system architecture to perform offline analysis. Each of the components shown in FIG. 2B may be implemented via any type of computing device, such as computing device 700 described with reference to FIG. 7, for example. The components may communicate with each other via a network 210B, which may include, without limitation, one or more local area networks (LANs) and/or wide area networks (WANs). Such networking environments are commonplace in offices, enterprise-wide computer networks, intranets, and the Internet.

It should be understood that any number of marketer device 208, data storage 203B, and online analysis tool 206 may be employed within the system of FIG. 2B within the scope of the present invention. Each may comprise a single device, or portion thereof, or multiple devices cooperating in a distributed environment. For instance, the online analysis tool 206 may be provided via multiple devices arranged in a distributed environment that collectively provide the functionality described herein. Alternatively, the online analysis tool 204 of FIG. 2A and the online analysis tool 206 of FIG. 2B may be combined as a single analysis tool to provide the computation functionality described herein. Additionally, other components not shown may also be included within the network environment.

The online analysis tool 206 is used to compute variable predictiveness in real-time in response to a user query, for example, input by a marketer at the marketer device 208. A user query may include a specific date range and/or indication of a metric, among other things. In some implementations, a query may include an indication of information that the user wishes to view. For example, the user may specify a desire to view a particular number (e.g., 5) of variables that generate the most accurate prediction of a specific metric. As another example, the user may specify a desire to view an indication of variable predictiveness for any number of variables.

Upon receiving a user query (e.g., from marketer device 208), variable predictiveness can be calculated in association with a metric, such as a predetermined metric or a metric specified by a user. The variables for which variable predictiveness is calculated may be of any number. For instance, in some cases, variable predictiveness in association with a metric may be calculated for all variables.

In some embodiments, variable predictiveness is represented by conditional mutual information or conditional predictiveness. To this end, conditional mutual information is computed for variables in relation to a metric, such as a revenue. Conditional mutual information generally refers to the expected value of the mutual information of two random variables given the value of a third and can be expressed via the following equation:

$$I(X;Y\mid Z)=\mathbb{E}_Z(I(X;Y\mid Z))=\sum_{z\in Z}p_Z(z)\sum_{y\in Y}\sum_{x\in X}p_{X,Y\mid Z}(x,y\mid z)\log\frac{p_{X,Y\mid Z}(x,y\mid z)}{p_{X\mid Z}(x\mid z)p_{Y\mid Z}(y\mid z)} \quad \text{Equation 2}$$

where the marginal, joint, and/or conditional probability mass functions are denoted by $p$ and corresponding subscript, and $p_z(z)$ is the probability of the condition.

As mutual information has been previously calculated and stored in association with various time periods (e.g., day), the mutual information associated with time periods (e.g., days) within a date range, such as a date range specified in a user query, can be referenced from data storage 203B (which may be the same as or different from data storage 203 of FIG. 2A) and used to generate conditional mutual information. For example, in response to a user query indicating a date range for which variable predictiveness is desired, a row scan can be performed to identify variables in an HBase table(s) and reference mutual information and aggregates for the days that fall within the specified date range. The weighted aggregate of probability of variable for each day in connection with the metric can also be calculated.

Upon obtaining data associated with a specified date range (e.g., identified in a query for variable predictiveness), conditional mutual information for a variable(s) in association with a metric can be calculated using the following equation:

$$\text{CMI}(V)=\text{Sum}\{p(V,d)\ast\text{MI}(V,d)\} \quad \text{Equation 3}$$

where p(V,d) is probability of variable V for day d and MI(V,d) is the mutual information of variable V for day d. The probability of variable V for day d can be calculated based on a number of occurrences or instances associated with a variable during a particular time period divided by the aggregated number of occurrences or instances associated with the variable during the date range. For instance, p(V,d) may equal the number of visits on day 1 for a variable divided by the aggregated number of visits for the variable during a specified date range. Sum refers to the summation over d, where d belongs to the date range {d1, d2}, for example, specified in a user query.

By way of example only and with reference to FIG. 4, assume that a user query is submitted requesting an indication of variable predictiveness with regard to Nov. 10, 2014 to Nov. 11, 2014. In such a case, to determine variable predictiveness with respect to the "browser" variable for that time period, the partial mutual information of 1.2 for Nov. 10, 2014 and the partial mutual information of 2.3 for Nov. 11, 2014 are referenced. The p(V,d) for Nov. 10, 2015 is calculated to be 0.534 (i.e., 803/1503), and the p(V,d) for Nov. 11, 2015, is calculated to be 0.466 (700/1503). 1503 is the aggregated number of visits for the browser variable during the date range Nov. 10, 2014 to Nov. 11, 2014. The conditional mutual information for the "browser" variable during the given time frame can then be calculated to be 1.71 (1.2*0.534+2.3*0.466). As such, the conditional mutual information of 1.71 can be provided as an indication of variable predictiveness or otherwise used to indicate variable predictiveness.

As can be appreciated, using conditional mutual information as a representation of variable predictiveness more effectively takes into account customer visit patterns because it accounts for distribution of visits for different days in date range rather than using absolute aggregates for date range. For example, for a same number of variable aggregates for a metric in date range of a holiday week and a normal week, the variable predictiveness will be different as distribution of visits might be different.

A conditional mutual information calculation can be performed for each variable. In other words, the online analysis tool 206 computes conditional mutual information of variables for a data range in association with a particular metric (e.g., selected by a user). Upon calculating conditional mutual information for variables (e.g., each variable), the conditional mutual information can be used to provide an indication of variable predictiveness in a report to a user requesting predictiveness. In some cases, variable predictiveness might be reported for each variable. In other cases, variable predictiveness might be reported for a set of the variables, such as, for instance, the five variables with the greatest variable predictiveness.

In some implementations, the conditional mutual information computed for a variable is used to represent the variable predictiveness of that variable. That is, variable predictiveness is computed via conditional mutual information, and thereafter, provided to a user, for instance, in response to a submitted query. In other cases, a computed conditional mutual information might be translated into a level or range of variable predictiveness, such as high, medium, or low. As another example, conditional mutual information for variables might be compared to one another to identify which of the variables are likely to most accurately predict the metric of interest. For instance, upon comparing the computed conditional mutual information for each of the variables, the five variables with the greatest conditional mutual information can be designated as the five variables to most accurately predict the metric of interest. In such a case, the five variables can then be provided to a user as an indication of variable predictiveness. In some cases, a threshold might be used such that any variable having a conditional mutual information that exceeds the threshold can be reported to a user as having a high variable predictiveness. These examples are only exemplary in nature and not intended to limit the scope of using or providing an indication of variable predictiveness.

Variable predictiveness, or indications thereof, can be provided to the marketer device 208 or other device. As such, a user (e.g., digital marketer) of the marketer device 208 can view variable predictiveness and other corresponding data. In this regard, an indication of variable predictiveness can be presented to a user, for example, in the form of a data report. For instance, in an advertising analytics environment, reports or data associated with variable predictiveness can be provided to a user of a marketing analytics tool. The user can then use such information to facilitate customization of a website, or portion thereof.

Additionally or alternatively, an indication of variable predictiveness can be used in an automated structure, for instance, to automatically customize a website. For example, assume that a variable predictiveness report indicates that age is an accurate predictor of a metric. Further assume that a user is visiting the website. In such a case, the age of the visitor may be used to automatically present the visitor (e.g., via a user device) with a more appropriate or effective advertisement(s).

Figure 5:
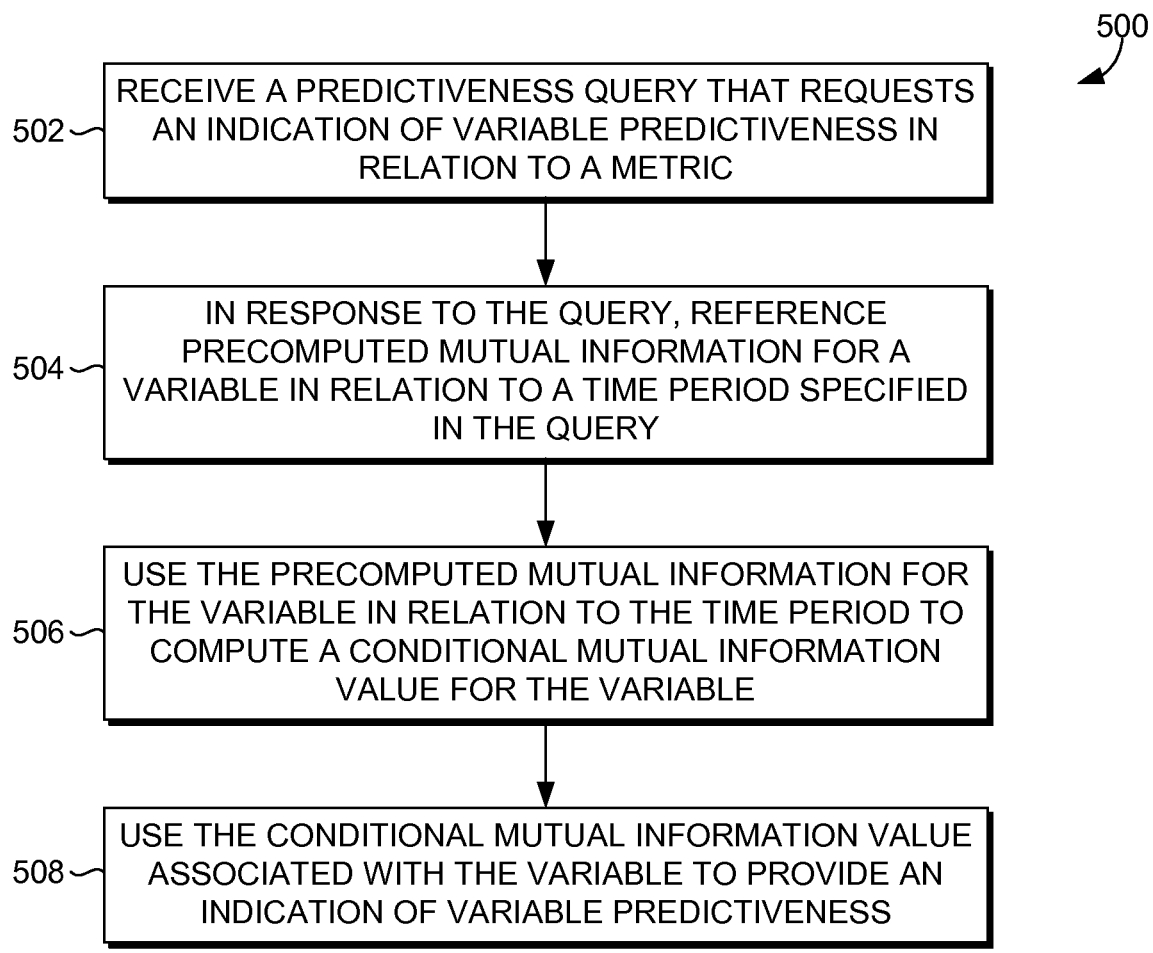
FIG. 5 is an exemplary flow diagram illustrating a method for computing variable predictiveness, in accordance with embodiments of the present invention.

Turning now to FIG. 5, an exemplary flow diagram illustrating a method 500 for computing variable predictiveness is generally depicted. In embodiments, the method 500 is performed by the online analysis tool 206 of FIG. 2, or other component(s) performing like functionality. Initially, at block 502, a predictiveness query that requests an indication of variable predictiveness in relation to a metric is received. The predictiveness query may include, among other things, a time period for which the indication of variable predictiveness is desired. As can be appreciated, in some embodiments, the query may also include a metric for which variable predictiveness is desired. At block 504, in response to the predictiveness query, precomputed mutual information for a variable is referenced in relation to the time period specified in the query. Subsequently at block 506, the precomputed mutual information for the variable in relation to the time period is utilized to compute a conditional mutual information for the variable. The conditional mutual information associated with the variable is utilized to provide an indication of variable predictiveness in association the variable during the time period. This is indicated at block 508. Although method 500 is described with reference to one variable, variable predictiveness can be calculated for any number of variables in relation to a metric.

Figure 6:
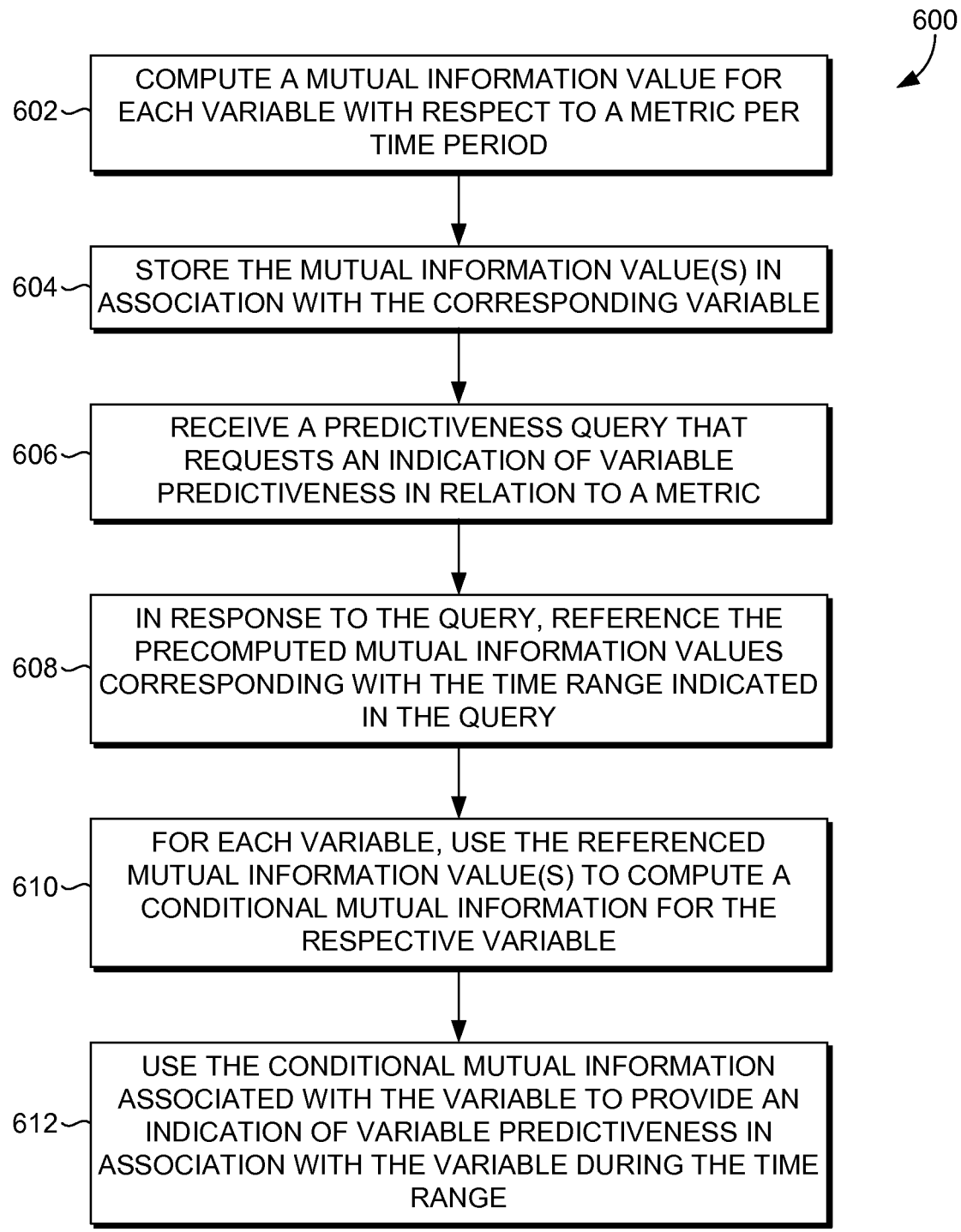
FIG. 6 is an exemplary flow diagram illustrating another method for computing variable predictiveness, according to embodiments of the present invention.

With reference now to FIG. 6, an exemplary flow diagram illustrating a method 600 for computing variable predictiveness is generally depicted. In embodiments, the method 600 is performed by the offline analysis tool 204 and the online analysis tool 206 of FIG. 2, or other component(s) performing like functionality. Initially, at block 602, a mutual information value is computed offline for each variable with respect to a metric for a per time period or time unit basis (e.g., per day). As an example, mutual information for each variable with respect to a metric can be calculated for each day that data has been observed. The mutual information value is stored in association with the variable, as indicated at block 604. In some embodiments, the mutual information is stored along with an indication of the time period (e.g., date) and an aggregate count of user visits with respect to that time period. Such data may be stored, for instance, in a HBase such that data can be efficiently scanned and referenced.

At block 606, a predictiveness query that requests an indication of variable predictiveness in relation to a metric is received. The predictiveness query may include, among other things, a time range or date range for which the indication of variable predictiveness is desired, such as, for instance, Dec. 20, 2014-Dec. 30 2014. As can be appreciated, in some embodiments, the query may also include a metric for which variable predictiveness is desired (e.g., conversions or revenue). At block 608, in response to the predictiveness query, the precomputed mutual information values corresponding with the designated time range are referenced for variables with respect to the metric. Subsequently at block 610, for each variable, the referenced mutual information value(s) is used to compute a conditional mutual information for the respective variable. To compute conditional mutual information, visit aggregates can be used to predict probability (or weight) of a particular day. Such a probability (or weight) can be used along with the corresponding mutual information to generate conditional mutual information for that variable. The conditional mutual information associated with the variable is utilized to provide an indication of variable predictiveness in association the variable during the time period. This is indicated at block 612. In some cases, the indication of variable predictiveness might be the computed conditional mutual information. In other cases, the conditional mutual information for the various variables might be compared to one another to select a number of variables (e.g., predetermined number of variables, such as five) to present as the variables that most accurately predict a metric. The variables regarded as most accurately predicting a metric are then provided as an indication of variable predictiveness.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 7:
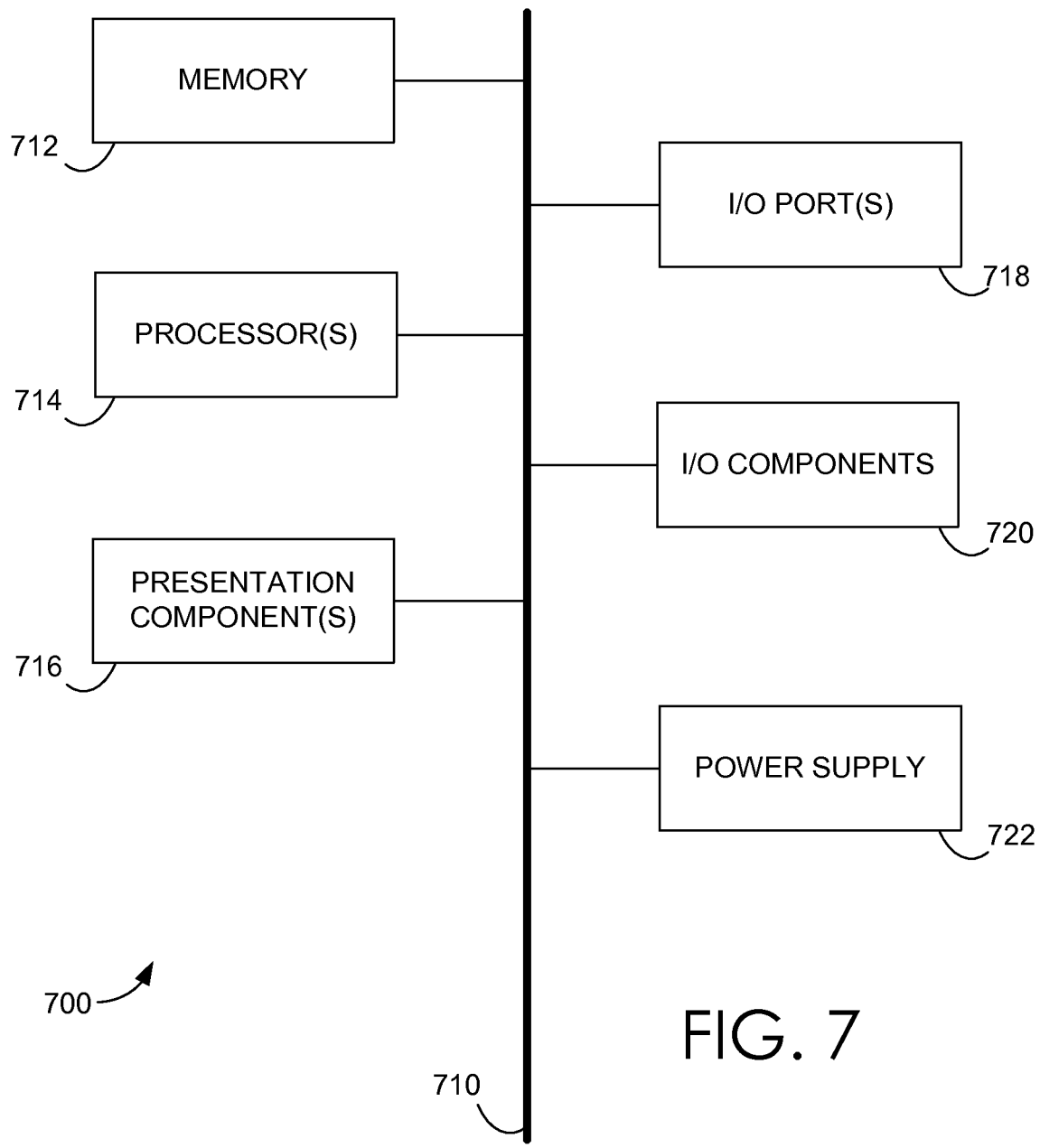
FIG. 7 is a block diagram of an exemplary operating environment suitable for use in implementing embodiments of the present invention.

Accordingly, referring generally to FIG. 7, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, forecasting metrics using causality based feature selection. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to facilitate computation of variable predictiveness, the operations comprising:
   receiving a predictiveness query that requests an indication of variable predictiveness relative to a metric related to performance of a website, the predictiveness query including a date range for which the indication of variable predictiveness is desired;
   in response to the predictiveness query, utilizing at least one predetermined mutual information for a variable corresponding with the date range to compute, in real time, conditional mutual information for the variable, the variable being associated with website navigation information, wherein the predetermined mutual information is determined in an offline calculation;
   utilizing the conditional mutual information associated with the variable to provide an indication of-variable predictiveness of the variable relative to the metric in relation to the date range, wherein the conditional mutual information is an expected value of the mutual information of the variable relative to the metric conditioned on the date range; and
   initiating modification of the website to customize the website for a user based on the variable predictiveness of the variable relative to the metric.

2. The one or more computer storage media of claim 1, wherein the conditional mutual information for the variable represents the mutual information conditioned on distribution of visit patterns for one or more days within the date range.

3. The one or more computer storage media of claim 1, wherein the predictiveness query specifies the metric for which an indication of variable predictiveness is desired and the date range.

4. The one or more computer storage media of claim 1, wherein the at least one predetermined mutual information for a variable is computed in an offline process prior to reception of the predictiveness query.

5. The one or more computer storage media of claim 1, wherein the at least one predetermined mutual information for the variable comprises a plurality of predetermined mutual information values for the variable, wherein each of the plurality of predetermined mutual information values corresponds with a unique day occurring within the date range.

6. The one or more computer storage media of claim 1, wherein the indication of variable predictiveness of the variable relative to the metric comprises conditional mutual information.

7. The one or more computer storage media of claim 1, wherein the indication of variable predictiveness of the variable relative to the metric comprises designating the variable as an accurate predictor of the metric.

8. The one or more computer storage media of claim 1, wherein the conditional mutual information for the variable is computed by:
   for each day in the date range, multiplying a predetermined mutual information corresponding with that day by a probability associated with that day to obtain a product value in association with the day, wherein the probability comprises an occurrence count on that day divided by the total occurrence count for the date range, and
   summing the product values in association with each day within the date range to obtain the conditional mutual information for the variable.

9. A computerized method for facilitating computations of variable predictiveness indicating extents to which variables can predict metrics, the computerized method comprising:
   computing, via a first computing process of an offline analysis tool, a mutual information value for a variable in relation to a metric related to performance of a website for at least each day within a date range, the variable being associated with website visitor information;
   receiving, via a second computing process, a query requesting an indication of variable predictiveness in association with the date range;
   in response to the query, using, via a third computing process of an online analysis tool, the mutual information values computed in association with the variable for each day within the date range to compute, in real time, a conditional mutual information in association with the variable for the date range;
   based on the conditional mutual information, providing, via a fourth computing process, an indication of variable predictiveness to indicate an extent to which the variable predicts the metric; and
   initiating modification, via a fifth computing process, to customize the website for a specific website visitor based on the variable predictiveness of the variable relative to the metric in relation to the specific website visitor, wherein the first, second, third, fourth, and fifth computing processes are performed by one or more computing devices.

10. The method of claim 9 further comprising storing the mutual information values computed in association with the variable for each day within the date range, wherein the stored mutual information values are used to compute the conditional mutual information.

11. The method of claim 10, wherein the mutual information values are stored in association with an indication of the variable and a corresponding date.

12. The method of claim 9, wherein the indication of variable predictiveness to indicate the extent to which the variable predicts the metric comprises the computed conditional mutual information.

13. The method of claim 9, wherein the indication of variable predictiveness to indicate the extent to which the variable predicts the metric comprises an indication that the variable accurately predicts the metric.

14. The method of claim 9, wherein the conditional mutual information for the variable represents the mutual information values for each day conditioned on distribution of visit patterns for the day as compared to visit patterns for the date range.

15. A computerized system comprising:
one or more processors; and
one or more computer storage media storing computer-useable instructions that, when used by the one or more processors, cause the one or more processors to:
for each time unit within a time range, perform an offline calculation of a mutual information value for a variable with respect to a metric;
store the mutual information values for each time unit with a number of user visits to a website associated with the corresponding time unit;
upon receiving a request for an indication of variable predictiveness in relation to the time range, reference and use the mutual information values for each time unit within the time range and corresponding number of user visits to the website to calculate, in real time, a conditional mutual information for the variable with respect to the metric; and
use the conditional mutual information for the variable to provide an indication of variable predictiveness, wherein the indication of variable predictiveness is used to initiate modification to customize the website for a specific website visitor based on the variable predictiveness of the variable relative to the metric the website.

16. The system of claim 15 further comprising a data store to store the mutual information values for each time unit with the number of user visits to the website associated with the corresponding time unit.

17. The system of claim 15, wherein the request for the indication of variable predictiveness in relation to the time range is initiated by a user via a user device.

18. The system of claim 15, wherein the indication of variable predictiveness is provided to the user that initiated the request for the indication of variable predictiveness.

19. The system of claim 15 further comprising automatically using the indication of variable predictiveness to customize the website.

20. The system of claim 15, wherein the conditional mutual information for the variable is compared to at least one other conditional mutual information for at least one other variable to select the variable as accurately predicting the metric.

* * * * *